United States Patent [19]

Mackey et al.

[11] Patent Number: 4,667,302
[45] Date of Patent: May 19, 1987

[54] ARBITRARY WAVEFORM GENERATOR SYSTEM

[75] Inventors: Peter J. Mackey, Hickville; Hakoop Hakoopian, Lake Grove; Michael A. Ramputi, Port Jefferson Station, all of N.Y.

[73] Assignee: Harris Corporation, Melbourne, Fla.

[21] Appl. No.: 549,250

[22] Filed: Nov. 4, 1983

[51] Int. Cl.[4] .............................. G06F 1/02
[52] U.S. Cl. .................................. 364/718
[58] Field of Search ..................... 364/718–722

[56] References Cited

U.S. PATENT DOCUMENTS

| | | | |
|---|---|---|---|
| 3,386,039 | 5/1968 | Naive | 328/181 |
| 3,689,914 | 9/1972 | Butler | 364/718 |
| 3,694,632 | 9/1972 | Bloomer | 364/719 |
| 3,962,573 | 6/1976 | Staley | 364/718 |
| 4,164,020 | 8/1979 | Griffith | 364/718 |
| 4,168,527 | 9/1979 | Winkler | 364/580 |
| 4,316,259 | 2/1982 | Albrecht et al. | 364/718 |
| 4,344,347 | 8/1982 | Faulkner | 364/722 |
| 4,438,502 | 3/1984 | Fox et al. | 364/718 |
| 4,521,865 | 6/1985 | Winkler et al. | 364/719 |
| 4,536,853 | 8/1985 | Kawamoto et al. | 364/718 |

OTHER PUBLICATIONS

Instruction Manual Model 175 Arbitrary Waveform Generator Instrument Release D-2/80, May 1980, Wavetek, San Diego, Calif.

Primary Examiner—Archie E. Williams
Assistant Examiner—Dale M. Shaw
Attorney, Agent, or Firm—Tarolli, Sundheim & Covell

[57] ABSTRACT

The waveform generator herein may be used to generate an analog waveform selected from a plurality of stored digital representations of waveforms. These are stored in a memory within a processor section of the system. At least one waveform generator section communicates with the processor section and receives parameter control words therefrom respecting the manner in which a waveform is to be generated. Each such generator section includes a function generator controller, a temporary waveform memory for storing a selected one of the waveforms and a digital-to-analog converter. After receiving the parameter control words from the processor section, the function generator controller operates independently of the processor section for reading the data words stored in the temporary memory and generating the selected analog waveform.

15 Claims, 4 Drawing Figures

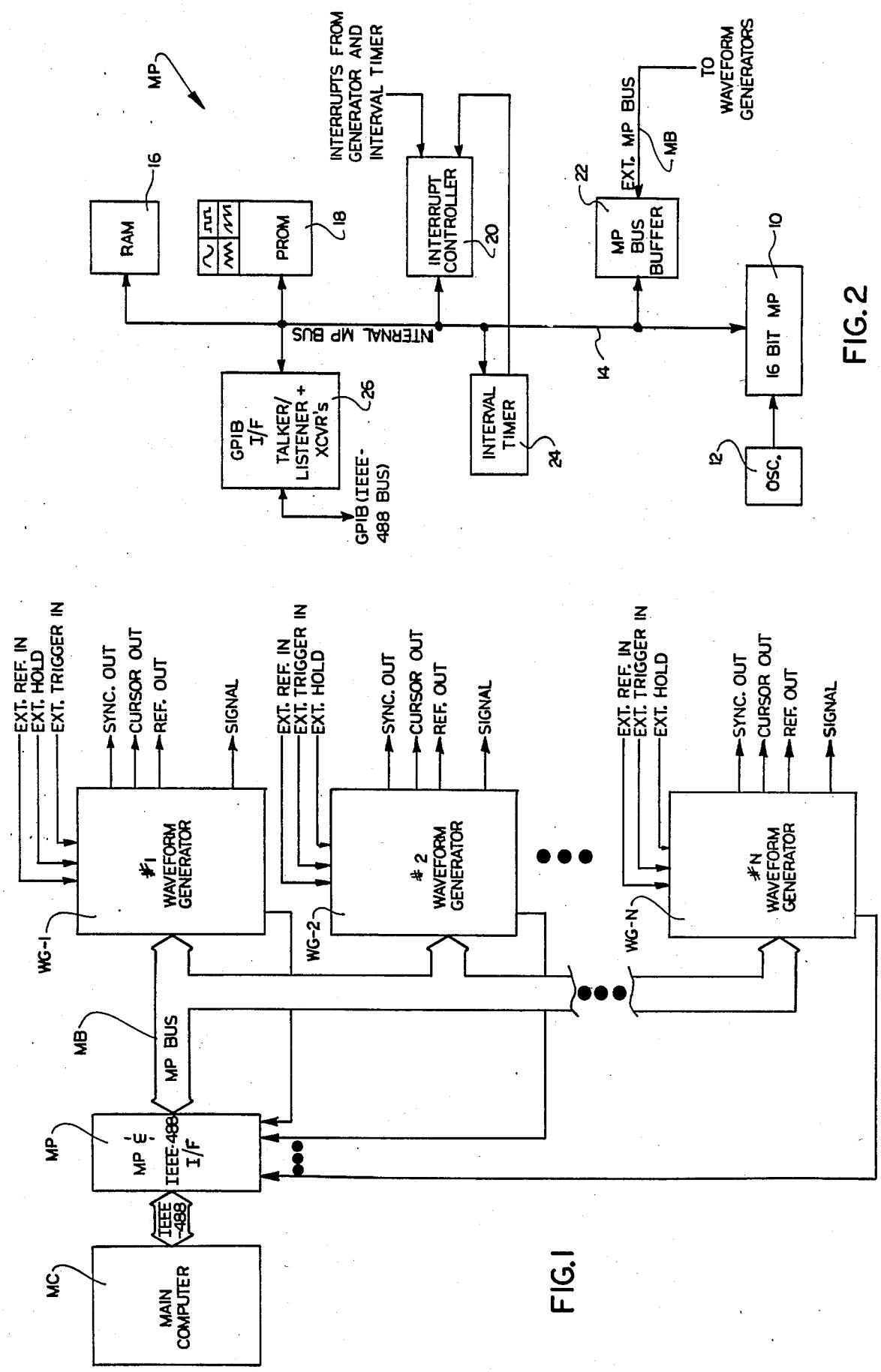

ARBITRARY WAVEFORM GENERATOR SYSTEM

BACKGROUND OF THE INVENTION

This invention relates to the art of waveform generators and more specifically to a waveform generator for generating an analog signal based on digitized representations of the waveform to be generated.

Waveform generators are known in the art. Such an example is found in the U.S. Pat. No. to J. A. Naive, 3,386,039. This patent discloses an analog system including a linear integrator and a switching circuit to produce a triangular waveform or square waveform or a sine waveform.

Another example of a prior art waveform generator is disclosed in U.S. Pat. No. to Butler, 3,689,914. In this approach, a digital signal is applied to an accumulator which accumulates and stores digital signals with the output of the accumulator being applied to a digital-to-analog converter to provide an analog output signal. The output signal takes the form of a triangular wave or a square wave.

With the advent of computer technology, waveform generators have included computer assistance. One example of this is found in the U.S. Pat. No. to Bloomer, 3,694,632. Here a matrix of digital differential analyzer (D.D.A.) integrators are employed in conjunction with a computer. The computer interconnects the integrators within a matrix for generating digital patterns representative of a particular waveform which is then converted by an digital-to-analog converter.

A more recent example of the prior art takes the form of the U.S. Pat. No. to Winkler, 4,168,527. This patent discloses a processor controlled waveform generator wherein a plurality of digitized waveforms are stored in a memory. Under processor control, these digitized words are supplied to a holding register which is provided to minimize skewing effects into an analog-to-digital converter.

Another example of recent prior art takes the form of a waveform generator available from Wavetek of San Diego, Calif. and known as their model 175 arbitrary waveform generator. This is described and illustrated in their instruction manual, Instrument Release D-2, 1980, Manual Revision, May, 1980. The Wavetek model 175 waveform generator is similar to that illustrated and described in the Winkler patent, supra. The model 175 waveform generator employs a memory for storing digitized waveforms and is on line with a processor. The processor selects a digitized waveform from the memory. Each data word obtained from the memory is supplied to a digital-to-analog converter for generating the analog version of the waveform. Additionally, under processor control, the memory is addressed from a programmed start address to a programmed stop address within a block of memory locations containing the digitized waveform. This generator has a continuous mode of operation or a triggered mode of operation, having a programmed number of cycles for generating the waveform.

SUMMARY OF THE PRESENT INVENTION

It is a primary object of the present invention to provide a waveform generator employing storage means for storing digitized waveforms similar to that in Winkler, supra, and in the Wavetek model 175, supra. But, unlike that prior art, it is a specific object of the present invention that the generation of the output waveform be accomplished independently of the data processor.

This is accomplished by providing a waveform generator that includes a processor section having a data processor and a memory wherein the memory stores a plurality of waveform patterns, with each pattern representing one period of a waveform on an X-Y grid and wherein each pattern is included within a block of a plurality of blocks of N data words in N sequentially addressable locations. Each data word represents the Y axis magnitude of a waveform data point and the address of the data point represents the X axis magnitude of that data point. The generator includes at least one waveform generator section that includes a function generator controller, a temporary waveform memory and a digital-to-analog converter. The temporary waveform memory stores a processor selected waveform obtained from the processor memory. Data words obtained from the temporary memory are converted by the analog-to-digital converter into analog signals representing the analog version of the selected waveform. The processor selects one of the waveforms in the processor memory and supplies the associated selected block of data words therein for storage in the temporary memory. The processor also supplies parameter control words to the function generator controller respecting the manner in which the selected waveform is to be generated. The function generator, after receiving the control words, operates independently of the processor for purposes of reading the selected block of data words stored in the temporary memory and supplies these to the digital-to-analog converter.

BRIEF DESCRIPTION OF THE DRAWINGS

The foregoing and other objects and advantages will become more apparent from the following detailed description of the drawings which are a part hereof and wherein:

FIG. 1 is a schematic-block diagram illustration of one embodiment of the invention connected to a main computer;

FIG. 2 is a schematic-block diagram illustration of the processor section employed in the preferred embodiment of the invention;

DESCRIPTION OF PREFERRED EMBODIMENT

Figure 3:
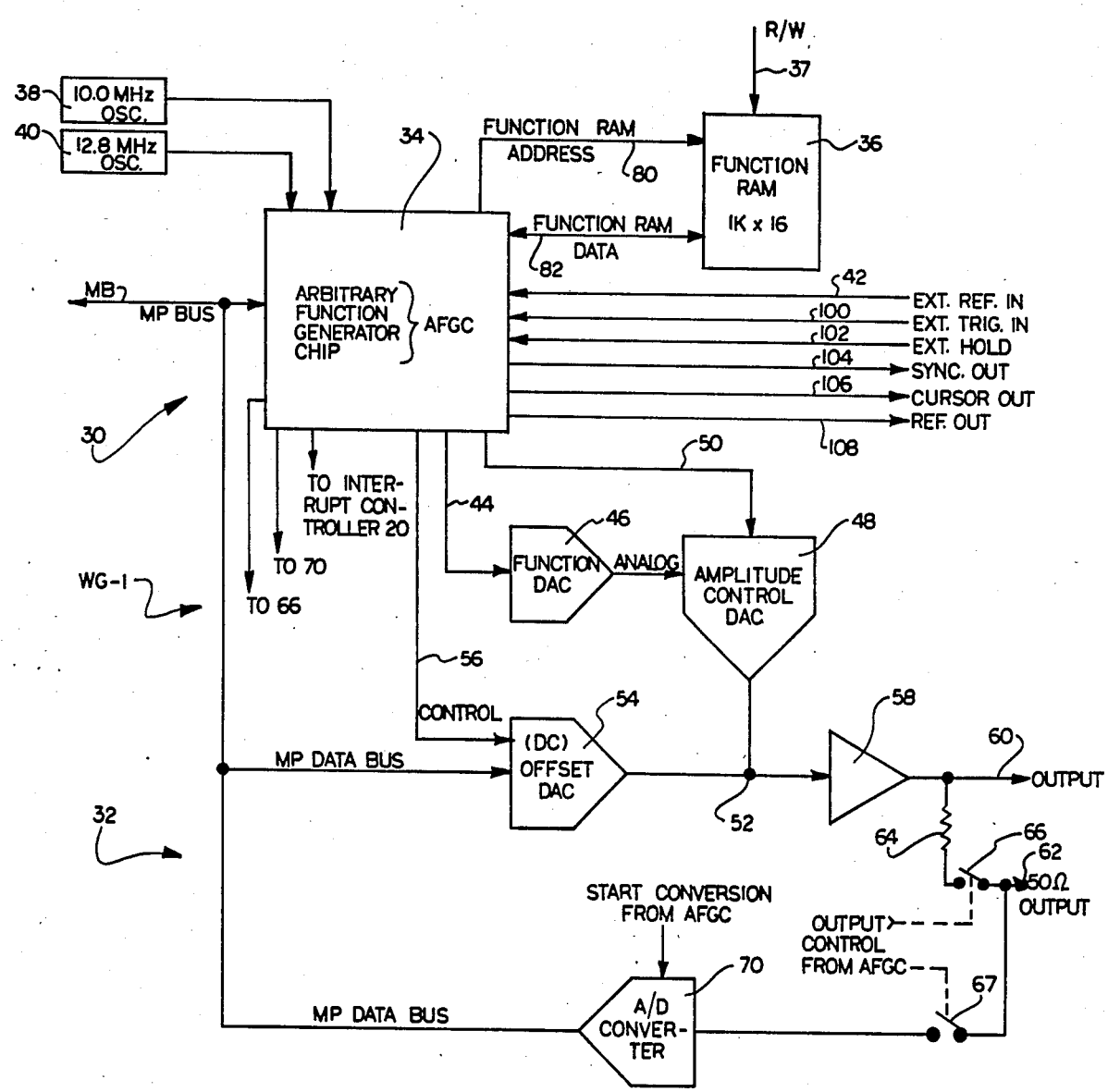
FIG. 3 is a schematic-block diagram illustration of the waveform generator employed in the preferred embodiment of the invention.

Reference is now made to the drawings and particularly to FIG. 1 which illustrates the arbitrary waveform generator system, in accordance with one embodiment of the invention, interfaced to an IEEE-488 bus structure with a main computer MC, from which data respecting parameters may be received at the system's microprocessor section MP. The system's microprocessor section MP communicates by way of its microprocessor bus MB with one or more waveform generators WG-1, WG-2 through waveform generator WG-N. The waveform generators communicate with the microprocessor section MP by way of this bus MB as well as by microprocessor monitored interrupts. Once the microprocessor section MP has loaded the appropriate data into a waveform generator, that generator will be conditioned to generate the desired waveform and supply an output signal in accordance with the waveform without further control from the microprocessor. Consequently, the microprocessor section may be used with a plurality N of such waveform generators, as is illustrated in FIG. 1.

Each waveform generator, as in the case of generator WG-1, may generate any waveform that can be expressed as a function of time. The waveforms themselves are stored in memory and digitally represented therein on an X-Y (time, amplitude) matrix. Preferably, each waveform is stored as a 256×255 data point matrix with the time or X as the memory address being sequential and the amplitude (memory data at the specified address) being arbitrary varying digital data points. Consequentially by sequentially addressing the memory it will output arbitrary varying digital data. The digitized waveform pattern is outputted from the memory and each data word is converted by a digital-to-analog converter scheme in the waveform generator to provide an arbitrary varying analog signal. That signal is scaled in accordance with a programmed scaling factor and may also be offset in the Y direction by a programmed offset factor within the analog section of the waveform generator. The resultant waveform is output on the SIGNAL output line from the waveform generator for use such as in a testing environment.

Each waveform generator WG-1 through WG-N is capable of providing four fixed waveforms, including sine wave, square wave, triangle and ramp, as well as arbitrary waveforms that have been user programmed and loaded into the microprocessor memory as by way of the IEEE bus. Each waveform, whether it be a fixed waveform or a user programmed waveform, is digitally represented in memory as data points within a 256×255 section of memory which contains a completely defined waveform.

Microprocessor Section

The microprocessor section MP is shown in greater detail in FIG. 2 to which reference is now made. The microprocessor section includes a 16 bit microprocessor 10 which may conveniently take the form of an Intel Model No. 8086 16 bit processor. The processor is supplied with clock pulses as from a crystal controlled oscillator 12. The processor communicates by way of an internal bus structure 14 with a random access memory 16 (RAM), a programmable read only memory 18 (PROM), an interrupt controller 20 and a microprocessor bus buffer 22 by which the microprocessor section communicates with the waveform generators by way of the external processor bus MB. Additionally, the microprocessor 10 communicates by way of its internal bus 14 with an interval timer 24 which is used as by software, for calculating various accurate time delays called for in the program control and supplies interrupts to the interrupt controller 20. A general purpose interface bus (GPIB) controller 26 interfaces between the microprocessor's internal bus 14 and the IEEE-488 bus to the computer MC. The controller 26 is conventional and serves to provide general handshake routines and the like.

Memory 16 has 16K addressable memory locations and is 16 bits wide and serves as a scratch pad memory. Additionally, memory 16 may store user programmed waveform patterns in digital format with each waveform being stored in a block of 256 sequential addresses. The data stored may be supplied by way of the IEEE-488 bus as from the main computer or from another source. Under processor control, the data is written into 256 sequential addresses in the random access memory 16. Memory 16 has 1K of space allocated for four user programmable blocks of waveform patterns (256 locations per block). Additionally, the user programmed block data stored in memory 16 may be accompanied by additional parameters such as a START address word, a STOP address word, a CURSOR address word, an AMPLITUDE control word and a RELAY control word, as well as other parameters to be described hereinafter in conjunction with waveform generation.

The microprocessor programmable read only memory (PROM) 18 has 16K addressable storage locations and is 16 bits wide. Of this, 1K of addressable storage space is allocated for four blocks of 256 words each for storing fixed or preset waveforms defining a sine wave, a triangle wave, a square wave and a ramp wave. These preset waveforms are graphically illustrated in the upper portion of memory 18 in FIG. 2, indicative that only a small portion of the memory contains these preset waveforms. The rest of the memory includes the operating system, self-test programs, as well as application programs. The four blocks of the memory dedicated to the storage of these four preset waveforms (sine, triangle, square and ramp) will respectively be referred to hereinafter as PROM blocks 1, 2, 3 and 4. Similarly, the four allocated storage blocks in memory 16 for user programmable waveforms will hereinafter be referred to as RAM blocks 1, 2, 3 and 4.

Waveform Generator

Each of the waveform generators WG-1 through WG-N takes the form of waveform generator WG-1 illustrated in FIG. 3 to which attention is now directed. Each waveform generator may be considered as having a digital section 30 and an analog section 32. The digital section 30 includes an arbitrary function generator chip 34, which will be described in greater detail hereinafter with reference to FIG. 4, and a 1K by 16 random access memory 36, sometimes referred to hereinafter as the function RAM. Clocking for the operations is obtained from either a 10.0 MHz oscillator 38 or a 12.8 MHz oscillator 40 or from an external clock source EXT. CLK. sometimes referred to herein as EXT. REF IN on line 42.

The function generator chip 34 communicates with the microprocessor section MP by way of the microprocessor external bus MB and, once the function generator chip has been loaded with appropriate commands and data, it may operate independently of the microprocessor section to generate an arbitrary waveform. Digital data representing each point of the waveform is supplied on a 15 bit bus line 44 to a function digital-to-analog converter (DAC) 46, which in a conventional manner, converts the digital data to a full scale analog signal which is then supplied to a multiplying amplitude control digital-to-analog converter 48. The converter 48 receives scaling digital data from the generator chip 34 by way of an 11 bit bus 50 to scale down the output analog signal in accordance with a programmed scaling factor. This scaled down analog signal is then supplied to a summing node 52 to which a DC offset bias is applied from an offset digital-to-analog converter 54. This digital-to-analog converter 54 includes a register for receiving a 10 bit control word by way of the microprocessor data bus when a write line 56 is raised by the generator chip 34. This DC bias will establish the Y value offset of the waveform from the X axis. The analog signal now with its proper offset bias and scaling is buffered as with an output buffer 58, and is supplied to either a 0 ohm output 60 or a 50 ohm output 62, by way of a 50 ohm resistor 64 under control by the function generator chip 34. Thus, whenever user requirements are such that the output waveform be provided at the 50 ohm output 62, the arbitrary function generator chip 34 outputs a command to switch 66, schematically illustrated in FIG. 3, to close the switch so as to provide the output waveform at the 50 ohm output terminal 62.

The arbitrary waveform generator system is provided with a self-test feature by which the processor may call for examination of the waveform being outputted. In such case, the processor communicates with the arbirary function generator chip which includes an interface decoding circuit which decodes various commands from the microprocessor. During the self-test operation, the arbitrary function generator chip 34 outputs a control command to activate the analog-to-digital converter 70 and to use switch 66 so that the converter supplies a digital representation of the outputted waveform, as seen at the 50 ohm terminal 62, and supplies the digital samples to the microprocessor by way of the microprocessor data bus.

The waveform to be generated is selected from one or more of the PROM blocks or from one or more of the RAM blocks in the microprocessor section and, under processor control, the data points are loaded into the function RAM 36. Once the waveform data has been loaded and the appropriate parameters have also been loaded, the generator chip acts in the form of a counter and sequentially addresses the waveform data points in the function ram 36 by way of a 10 bit function RAM address bus 80. Each waveform pattern is stored as 256 data words representing 256 points on the waveform and these are stored so as to be addressed in sequence and output by way of a 16 bit function RAM data bus 82. Only 15 of the bits represent a data point with one bit being a control bit indicating whether the data point is to be interpolated or not interpolated (a smoothing function). This is interpreted and acted upon internally of the function generator chip 34.

The function RAM 36 is partitioned into four 256 by 16 RAM blocks which will allow loading of each memory segment (256 words) for output to the function digital to analog converter 46. The microprocessor data bus and the function RAM data bus have a point to point correspondence (i.e., bit 0 of the microprocessor data bus and bit 0 of the function RAM data bus are both the least significant bit LSB). In addition to providing addresses for addressing the function RAM 36, the arbitrary function generator chip 34, as will be discussed in detail with reference to FIG. 4, also provides clock generation for the sample times (the time between digital words) over a range from between 0.2 microseconds and 999.9 seconds. Start and stop address parameters are provided to enable operation anywhere between 0 and 1023 (the range of addresses in the function RAM 36). A preset length counter serves to stop operation after a predetermined number of cycles. Also, a digital interpolator may be used to compute intermediate values between each data point to provide a smoothing function.

Figure 4:
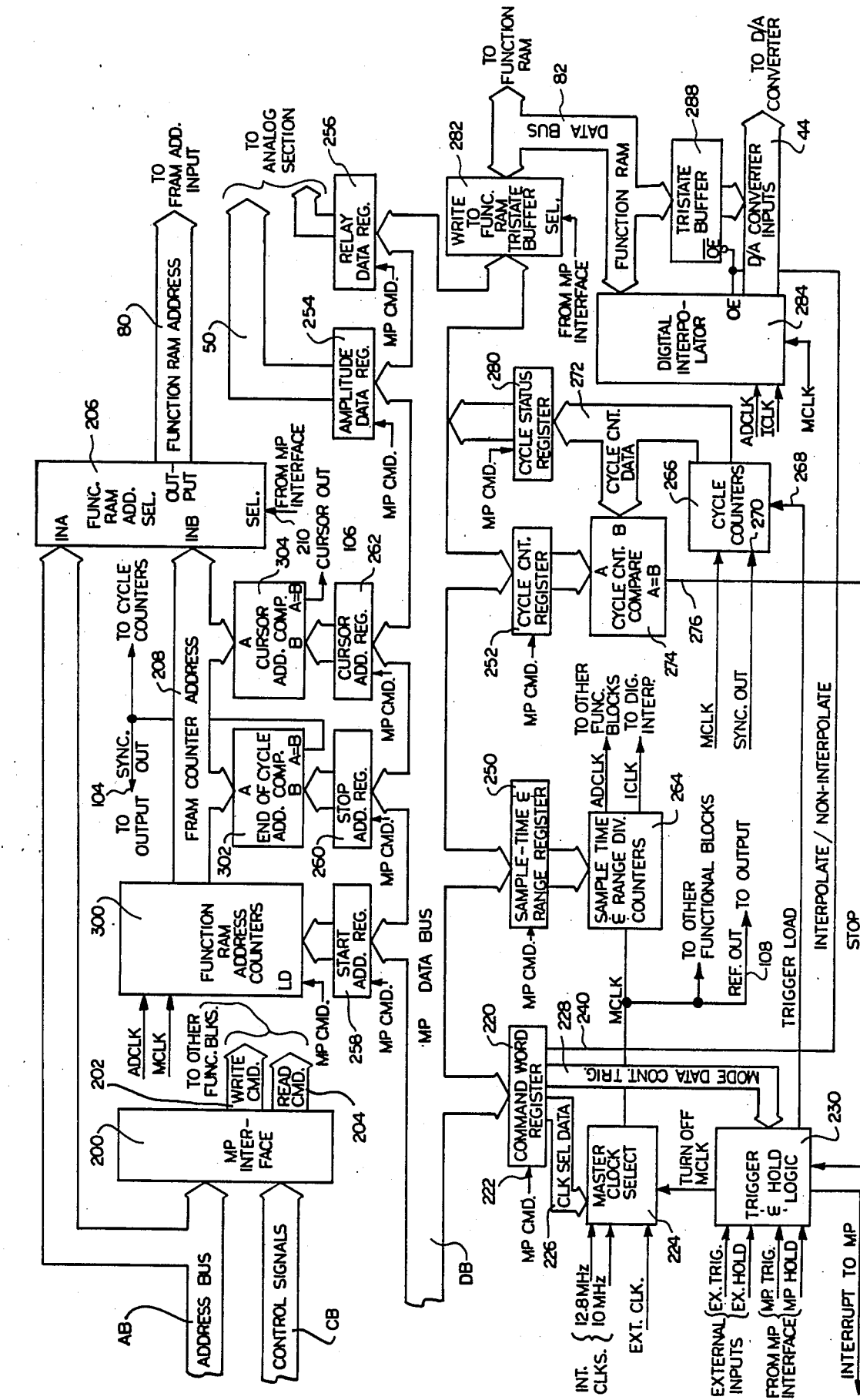
FIG. 4 is a detailed schematic-block diagram illustration of the function generator chip illustrated in FIG. 3.

To assist in the understanding of the detailed description herein relating to the function generator chip 34 as depicted in FIG. 4, it is believed useful to first consider the various modes of operation that are available, as well as the various inputs and outputs labelled in FIG. 3.

There are several modes of operation available. These are dictated by a mode control word supplied to the function generator chip 34 from the processor section MP by way of its external microprocessor bus MB. The mode control word is a 16 bit word and is decoded in the function generator 34 to dictate the mode of operation. The modes include continuous, preset triggered, monitor triggered and hold control. These modes are described below in Table 1.

TABLE 1

| | |
|---|---|
| 1. Continuous | In this mode of operation, the waveform is output continuously at the selected specifications. |
| 2. Preset Triggered | In this mode of operation the waveform generator is quiescent until triggered as by way of the IEEE interface bus or an external trigger which may be user controlled. This is accomplished, for example, by raising the EXT. TRIG IN line 100 as viewed in FIG. 3. After the trigger, a preset number of cycles, up to 9,999, is output at the selected specifications. |
| 3. Monitor Triggered | In this mode of operation, the waveform generator is operated as in mode 2 above, and the output waveform is continuous after being triggered until receiving an external hold (EXT. HOLD) on line 102, see FIG. 3 or until such an input has been received from the IEEE interface bus. Up to 9,999 cycle counts can be read back over the IEEE interface bus. |
| 4. Hold Control | The generated waveform can be stopped, asynchronously to the reference clock, by way of the IEEE interface or by raising the EXT. HOLD line 102 (see FIG. 3). This mode is available in trigger modes only. The waveform may be restarted by using the trigger signal or an IEEE trigger command. |

The selection of the mode of operation as well as the clock selection is dictated by a mode control word supplied by way of the microprocessor bus MB to the function generator chip. This is a 16 bit word with bit B0 being the least significant bit and bit B15 being the most significant bit. Bits B0 and B1 are decoded for clock selection in accordance with Table 2 below.

TABLE 2

| Bit B0 | Bit B1 | Clock |
|---|---|---|
| 0 | 0 | Invalid |
| 0 | 1 | External clock |
| 1 | 0 | 12.8 MHz |
| 1 | 1 | 10.0 MHz |

As seen from Table 2, bits B0 and B1 of the mode control word may be decoded to select either an external clock which is obtained from the EXT. REF. IN line 42, or a 12.8 MHz clock obtained from oscillator 40 or a 10.0 MHz clock obtained from oscillator 38.

In this same mode control word, bits B4 and B5 determine the mode of operation. Reference is now made to Table 3 below.

TABLE 3

| Bit B4 | Bit B5 | Mode |
|---|---|---|
| 0 | 0 | Preset triggered |
| 0 | 1 | Invalid |

TABLE 3-continued

| Bit B4 | Bit B5 | Mode |
| --- | --- | --- |
| 1 | 0 | Monitor triggered |
| 1 | 1 | Continuous |

From Table 3 it is seen that the mode control word may be decoded by the arbitrary function generator chip to select preset triggered, monitor triggered or continuous mode of operation.

With reference to FIG. 3, it will be noted that in addition to communicating with the microprocessor section MP, the function generator chip 34 may receive user supplied commands such as EXT. REF. IN on line 42 or EXT. TRIG. IN on line 100 and EXT. HOLD on line 102. In addition to the waveform signal outputs at the 0 ohm output 60 and 50 ohm output 62, there are additional outputs including a SYNC. OUT on line 104, a CURSOR OUT on line 106 and a REF. OUT on line 108, all of which may be supplied to the user. These external inputs and outputs to the function generator chip 34 may be better understood with reference to Table 4 below before considering the detailed circuitry in FIG. 4.

TABLE 4

| | |
| --- | --- |
| CURSOR OUT | The CURSOR OUT signal is a TTL compatible, positive-going pulse which is coincident with a particular data point at a preprogrammed cursor address. This cursor address is supplied under processor control to the arbitrary function generator chip by way of the microprocessor bus MB and when the operation is such that the waveform point corresponding to this cursor address is being generated, the CURSOR OUT signal will be placed on the CURSOR OUT line 106 (FIG. 3). |
| SYNC OUT | This is a TTL compatible, positive-going pulse, with its leading edge being coincident with each STOP address of the output waveform. If a full block of the waveform is being generated this signal will rise at address 255 and will fall at address 0. In a triggered mode of operation, this signal will rise and remain high until the waveform generator is triggered (coincident with a START address). The signal will appear at the end of each cycle of a triggered burst. The signal appears on the SYNC OUT line 104 (FIG. 3). |
| EXT. HOLD | When the function generator is in its triggered mode, and an EXT. HOLD input is obtained by way of line 102 (FIG. 3), the output waveform is held at its present voltage level and the microprocessor is interrupted. The waveform will be resumed from the point at which it was held by way of a signal received from either the EXT. TRIG. input line 100 or by way of the microprocessor through the IEEE interface bus. |
| EXT. TRIG. IN | When the function generator is in its trigger mode of operation and this signal is received on input line 100 (FIG. 3), the output waveform will be initiated such as after a microprocessor interrupt as discussed immediately above. |
| EXT. REF. IN | This is a user supplied clock input on line 42 for purposes of having the function generator operate with an external clock EXT. CLK. which will then be used instead of the 10.0 MHz clock or the 12.8 MHz clock. This clock will then become the master clock (MCLK) for internal operation. |
| REF. OUT | This is the master clock MCLK (reference clock) which is used internally by the function generator and may be outputted to the user by way of output line 108 (see FIG. 3). |
| 0 ohm output | This is an output which presents less than a 1 ohm source of the generated waveform and is taken directly from the output amplifier at output terminal 60 (FIG. 3). |
| 50 ohm output | This output is the 50 ohms source of the generated waveform. This is a program selectable output and requires that the control signal be outputted from the function generator to effectively close switch 66 to activate the 50 ohm output terminal 62 (FIG. 3). |

The arbitrary function generator 34 is illustrated in detail in FIG. 4 to which the following description is primarily directed. The function generator interfaces with the microprocessor section MP (FIGS. 1 and 2) by way of the microprocessor external bus MB. This bus includes a 16 bit address bus AM, a 16 bit data bus DB and a multi-line control bus CB. The address bus AB and the control bus CB connect to the waveform generator at a microprocessor interface 200. This interface serves to decode the microprocessor generated control signals and addresses and then supplies WRITE commands or READ commands to the various functional blocks of FIG. 4 as the case may require. Thus, the interface 200 has a plurality of WRITE command outputs 202, each of which serves as a WRITE command input the required functional block so as to enable that block to receive data from the microprocessor data bus DB. Similarly, the interface supplies READ commands at its READ command outputs 204, each directed the required blocks at which data is to be read and placed on the microprocessor data bus. Ten bits of the address bus AB are also supplied directly to an input INA of a function RAM address selector 206. This address selector uses either the 10 bit address obtained from the address bus AB for addressing the function RAM 36 (FIG. 3) or 10 bits received from a function RAM counter address bus 208 which are applied to a second input INB. The choice as to which address is routed to the function RAM address bus 80 and thence to the function RAM 36 depends on whether a WRITE command (used only as an enable) from the microprocessor interface 200 is supplied to the select input 210 of selector 206. Whenever the selector input 210 is raised, then the address obtained from the address bus AB and supplied to input INA is outputted on the function RAM address bus 80, otherwise the address obtained from address bus 208 and applied to input INB is selected as the function RAM address.

During the period of loading waveform data into the function RAM 36, the microprocessor MB will select the waveform or waveforms stored in its memories 16 and 18 and will place that data on its data bus as a sequence of 256 data words. Each data word represents the amplitude or Y value of the waveform and one of 256 sequential addresses (or X values). It is prior to this period that the processor raises the select line 210 of the address selector 206 so that at each address a 16 bit data word from the data bus DB will be written into the addressed location of the function RAM 36. Up to four blocks of data, each 256 addresses long, each representative of either a fixed or user programmed waveform may be entered into the function RAM 36. The READ/WRITE input 37 in the function RAM (see FIG. 3) may be lowered by the interface 200 when data is being written into the function RAM at the address locations. Otherwise, data is being read from the addressed location.

In addition to loading the function RAM 36 with data from the microprocessor section MP, various parameters are loaded into various registers within the function generator before commencing operation to generate a waveform. This includes the mode control word discussed previously, which under processor control is placed on the data bus DB and is written into a command word register 220 when this register receives a microprocessor WRITE command at its input 222 from one of the WRITE command outputs 202 of the interface 200. This mode control word has 16 bits. The command word register serves to select which clock shall be in operation as well as to select the mode of operation in effect. As will be recalled from Tables 2 and 3, the clock select data is located in the control word at bits B0 and B1. This data is supplied to a master clock select logic circuit 224 by way of a clock select data bus 226, which may be a two-wire bus providing binary levels at bits B0 and B1. Similarly, the mode control data at bits B4 and B5 is supplied by register 220 by way of a two-line mode data bus 228 to a trigger and hold logic circuit 230.

The master clock select logic circuit 224 includes logic for decoding bits B0 and B1 of the mode control word in accordance with Table 2 to select as its output clock, referred to hereinafter as the master clock MCLK, as either the 12.8 MHz clock or the 10 MHz clock or the external clock EXT. CLK. Normally, the master clock will be that of the the 10 MHz clock, as the 12.8 MHz clock is used for interpolation operation and the external clock is the user supplied clock. The master clock MCLK serves as the basic timing clock within the function generator, and, for example, the incremental rate at which addresses are generated for addressing the function RAM 36 will be synchronized to the master clock.

The trigger and hold logic circuit 230 decodes the mode control word bits B4 and B5 in accordance with the Table 3 to select the mode of operation as being either preset triggered, monitor triggered or continuous. In the continuous mode, the function generator will continuously output the selected waveform. Additionally, during this mode, the trigger or hold inputs from the microprocessor interface or from external inputs commanding either trigger or hold operations will have no effect. However, if bits B4 and B5 of the mode control word are decoded so that the mode of operation is triggered, either preset or monitoring, then the waveform generator will remain idle until a trigger signal is received from either an external input or from the microprocessor interface so as to commence operation. The trigger and hold logic 230 also receives a STOP input from a cycle compare circuit once a predetermined number of cycles has been counted, and this or a HOLD command received either from an external input or from the microprocessor interface will cause the trigger and hold logic circuit to shut off the master clock MCLK. Additionally, the trigger hold and logic circuit 230 has a trigger load output which it raises to reset the cycle counter so that it is conditioned for counting cycles during a triggered mode of operation.

The command word register 220 also inspects bit B2 of the mode control word which selects whether a smoothing operation (interpolation) is to take effect. If so, the control word register will raise its interpolate/noninterpolate output 240 to enable operation of a digital interpolator to be discussed hereinafter.

In addition to loading the command word register 220, the processor section also controls the loading of the various additional parameters prior to waveform generation. This includes loading a sample time control word into a sample time and range register 250, a cycle count word in a cycle count register 252, an amplitude control word in an amplitude data register 254, a relay control word in a relay data register 256, a START control word in a START address register 258, a STOP control word in a STOP address register 260 and a cursor control word in a cursor address register 262. The purpose of these control words and registers and associated circuitry will be described below.

Under processor command, the sample time and range control word is loaded into the sample time register 250. This is supplied to a sample time and range divider counter circuit 264 which receives the master clock MCLK from the master clock select circuit 224 and serves to divide down the master clock for different programmable ranges in accordance with the sample time control word. This then provides the address clock ADCLK which is synchronized to the master clock MCLK for developing function RAM addresses by a function RAM address counter to be discussed hereinafter. Additionally, the sample time and range divider counters 264 may, during smoothing or interpolating operations, divide down the master clock MCLK by a factor of 128 to provide an address clock ADCLK. An interpolator clock ICLK will be provided which is 128 times faster than the ADCLK. Thus, the divider counters 264 operate in conjunction with the programmable control word that is supplied to register 250 to divide down the master clock MCLK with different programmable ranges. The counters will automatically load and reload on the fly to accomplish this.

Under microprocessor control, a cycle count control word is loaded to the cycle count register 252. This is used during the preset trigger mode and the register will contain a programmable control word that defines the predetermined number of cycles of operation to be in effect. To accomplish this, the function generator includes a cycle counter 266 which is reset at input 268 to a count of zero by a trigger load pulse at the commencement of waveform generation in the continuous mode and on receipt of a trigger command during the trigger mode of operation. The cycle counters 266 is synchronized to the master clock and counts the number of cycles of the output waveform since the trigger load pulse was received at input 268. At the end of each cycle, a SYNC OUT pulse is supplied to an input 270 of the counter and it is these pulses that are counted by the cycle counters. The output count of the cycle counters 266 is available on a 10 bit cycle count data bus 272 which is supplied to the B input of a cycle count comparator 274. The cycle count comparator compares the count supplied at input B with the programmed cycle count in register 252 which is applied to input A of the comparator. When the counts are equal, the comparator issues a STOP command at its output line 276 and this is applied to the trigger and hold logic circuit 230 to turn off the master clock MCLK to define the end of a predetermined number of cycles. This comparator will stop waveform generation in the triggered mode.

The cycle counter 266 is capable of counting to a count of 9,999 cycles and this counting takes place regardless of the mode of operation. Under processor control, the present count may be loaded into a cycle status register 280 upon raising the microprocessor READ command from the interface to the register. This places the cycle count on the microprocessor data bus DB so that the count may be used by the microprocessor as for providing a comparison number of waveform cycles for testing purposes.

When the function RAM 36 is being loaded with data points making up a waveform, the location at which the data is written into the memory is obtained from the address bus AB whereas the data itself (the Y value) is obtained from the microprocessor data bus DB. This data, under processor control, is first loaded or buffered into a write to function command tristate buffer 282 which, when selected by a command from the microprocessor interface 200 serves to buffer these data points and place them on the function RAM data bus 82 to be written into the function RAM 36. When the data points are being read out of function RAM 36, they are also placed on the function RAM data bus 82 within the arbitrary function generator 34. This outputted waveform data on bus 82 is supplied to a digital interpolator 284 when interpolation or smoothing operations are being conducted. In such case, the digital interpolator will be enabled by the command word register 220 raising its output line 240. When the digital interpolator 284 is enabled, it receives data points from the data bus 82 and provides an interpolation between adjacent data points. This is a smoothing operation and takes place at the clock rate ICLK and serves to insert 128 points between each function RAM data point. These 128 data words, then, are inserted between successive data words obtained from bus 82 and are placed on the output data bus 44 which supplies the data points as well as the interpolated data points to the function digital-to-analog converter 46 (see FIG. 3). If interpolation is not in effect, a tristate buffer 288 is enabled to pass only the data points obtained from the function RAM by way of bus 82 via output data bus 44. However, in this mode, only the eight most significant data points are used. The remaining bits are each at a zero level.

Returning now to the loading of parameters in the registers, an amplitude control word will be loaded, under command from the interface, into the amplitude data register 254. This data word is supplied by way of bus 50 (see FIG. 3) to the amplitude control digital-to-analog converter 48 for scaling the analog output signal from the converter 46 in accordance with the value of the data word programmed into register 254. This provides a means to achieve user programmed scaling of the output waveform. The offset programming is written directly into a register located within the offset digital-to-analog converter 54 from the microprocessor data bus as illustrated in FIG. 3. In this manner, the function generator system provides programmable amplitude and programmable offset control of the output waveform.

The data bus DB also supplies a relay data control word which, under command from the interface 200, is written into a relay data register 256. This data word is used for control of output selection and for self-testing purposes. Thus, in terms of output selection, this data word controls the closing of switch 66 (see FIG. 3) so that the 50 ohm output 62 is effective. Additionally, when the switch 66 is closed and a switch 67 is closed then a self-test function may be obtained by enabling the analog-to-digital converter 70 (FIG. 3) from interface 200 to start converting the 50 ohm output waveform into digital data to be supplied to the microprocessor data bus for use in the self-testing analysis of the system.

A full block of data points for a waveform will include 256 X addresses. In some cases, a waveform to be generated may take less addresses than a full block. In this case the waveform to be generated will commence at a programmed START address and will end at a programmed STOP address. In the case of a full block, the programmed START address will be an address 0 and a programmed STOP address will be at address 255. The programmed START address will, on command from the interface 200, be loaded from the data bus DB into the START address register 258. The START address word, on command, sets a function RAM address counter 300 to an initial START address. This address is made available on the function RAM counter address bus 80 by way of the function RAM address selector 206.

During the operation of reading the function RAM, the address selector 206 supplies addresses to the address bus 80 from the counter address bus 208 and these are taken from the output of the function RAM address counter 300. Consequently, the initial address as clock pulses are supplied to the address counter 300 will be that of the START address. Thereafter, the counter 300 is incremented through the remaining 255 addresses if a full block has been selected (i.e., the starting address is at 0 location). These sequentially incremented addresses are supplied to the address bus 80 to sequentially address the function RAM 36. The function RAM, then, will be addressed at a rate dependent upon the clock frequency of incrementing counter 300. This may be the frequency of the master clock MCLK or may be varied in accordance with the programmed sample time control word supplied to the sample time register 250, which is used by the divider counter 264 to divide down the master clock by different programmable ranges providing an address clock ADCLK. The incrementing of the counters 300 by the address clock ADCLK is synchronized to the master clock MCLK.

The end of a cycle will be dictated by a STOP address word which, on command from the interface, is loaded into the STOP address register 260 from the microprocessor data bus DB. A STOP address word defines the STOP address in the function RAM of the end of a cycle. If a single full block is to be generated, then, the STOP address will be at address 255. If the waveform to be generated takes less than a full block, then, the STOP address may be an address between 0 and 255. This is a programmable address. Up to four blocks or 1,024 addresses may be stored in function RAM 36. If four blocks of data are stored, they may be linked together during waveform generation as by defining a STOP address up to 1,023.

The end of a cycle is defined by comparing the STOP address word in register 260 with the count of the address counter 300 as it appears on the function RAM counter address bus 208. These are compared with an end of cycle comparator 302 and when a comparison is achieved, the comparator provides a SYNC OUT signal which appears on output line 104 (see FIG. 3) and, in addition, is supplied to the cycle counters 266 to increment the cycle count.

A CURSOR OUT signal on line 106 (see FIG. 3) is available at the time that a specific programmable data point is being generated. This is accomplished by loading a cursor address word in the cursor address register 262 on command from the interface. When this programmable address compares with that on the counter address bus 208, a cursor address comparator 304 raises the CURSOR OUT line 106.

Although the invention has been described with reference to a specific embodiment, it is to be appreciated that various modifications and arrangements of components may be made within the spirit and scope of the appended claims.

What is claimed is:

1. A waveform generator system comprising:

a processor section including data processing means and memory means, said memory means storing a plurality of waveform patterns with each pattern representing one period of a waveform on an X-Y grid, each said pattern being included within one block of a plurality of blocks of N data words located in N sequentially addressable locations of said memory means and with each data word representing the Y axis magnitude of a waveform data point and with the address of the data point representing the X axis magnitude of the data point;

at least one waveform generator section each including a function generator controller, a temporary waveform function memory for temporarily storing at least one processor selected waveform obtained from said processor memory means and digital-to-analog converter means for converting digital words obtained from said temporary function memory into analog signals representing the analog version of the selected waveform;

said processing means being programmed to selectively address one of the waveforms in said processor memory means for supplying a selected block of data words representing the selected waveform for temporary storage in said temporary function memory and for supplying parameter control words to said function generator respecting the manner in which the selected waveform is to be generated;

said function generator controller including means for receiving and responding to said control words for thereafter and independently of said processing means addressing said temporary function memory to obtain the selected block of data words stored therein and for supplying them to said converter means to generate the analog version of the selected waveform;

said function memory is a read-write random access memory for storing a plurality of waveforms obtained from said processor memory means with each said waveform being stored as data words within N sequentially addressable locations therein;

said function generator controller includes means for sequentially addressing each of said N addressable locations of each block of data words stored in said functional memory so as to sequentially obtain therefrom up to N data works representing sequential data points of a selected waveform, means for the controlling the addressing of said function memory so as to commence said addressing at a first of said N sequentially addressable locations and to stop addressing said memory at a second subsequent addressable location, and a cursor address register preloaded by said data processing means with a cursor address control word defining an address within the selected waveform at which an output cursor signal is to be provided, and means for comparing the cursor address control word with the address being supplied to the function memory and upon a comparison providing a cursor output signal.

2. A waveform generator system as set forth in claim 1 wherein said means for controlling the addressing of said function memory includes a start address register initially loaded under processor control with a said control word defining a start address representing the location in the function memory of the first data point to be generated.

3. A waveform generator system as set forth in claim 2 wherein said means for sequentially addressing said function memory includes an address counter sequentially incremented by address clock pulses for supplying addresses for addressing said N addressable locations of said function memory, said address counter being presettable to an initial starting address in accordance with the start address in said start register.

4. A waveform generator system as set forth in claim 1 wherein said means for controlling the addressing of said function memory includes a stop address register initially loaded under processor control with a said control word defining a stop address representing the last data point to be generated.

5. A waveform generator system as set forth in claim 4 wherein said means for controlling the addressing of said function memory includes end of cycle comparator means to provide an end of cycle signal when the address provided by said addressing means corresponds with the stop address in said stop address register.

6. A waveform generator system as set forth in claim 5 including cycle counting means incremented by one count for each end of cycle output signal provided by said end of cycle comparator means.

7. A waveform generator system as set forth in claim 6 including a cycle count register initially loaded under processor control with a said control word representing the number of cycles of the waveform to be generated and means for comparing the count in said cycle counting means with the cycle count control word in said register and on obtaining a comparison providing a stop output signal.

8. A waveform generator system as set forth in claim 7 including logic control means for controlling the supply of clock pulses to said function memory addressing means and responsive to a said stop signal for terminating the supply of clock pulses to the addressing means.

9. A waveform generator system as set forth in claim 6 including a cycle count status register operative under processor command to read the present count of said cycle counting means and to provide that count to said data processing means.

10. A waveform generator system as set forth in claim 1 including an amplitude data register initially loaded by said data processing means with a said control word defining a scaling factor, said digital-to-analog converter means including analog scaling means responsive to said scaling control word for scaling the magnitude of the outputted analog signal in accordance therewith.

11. A waveform generator system as set forth in claim 10 including offset control means initially loaded by said data processing means with an offset control word for effecting a DC offset of the outputted analog waveform.

12. A waveform generator system as set forth in claim 11 including analog-to-digital converter means operable under processor command to supply a digital representation of the outputted analog waveform signal to said data processing means for use in self-test analysis.

13. A waveform generator system comprising:

a processor section including data processing means and memory means, said memory means storing a plurality of waveform patterns with each pattern representing one period of a waveform on an X-Y grid, each said pattern being included within one block of a plurality of blocks of N data words located in N sequentially addressable locations of said memory means and with each data word representing the Y axis magnitude of a waveform data point and with the address of the data point representing the X axis magnitude of the data point;

at least one waveform generator section each including a function generator controller, a temporary waveform function memory for temporarily storing at least one processor selected waveform obtained from said processor memory means and digital-to-analog converter means for converting digital words obtained from said temporary function memory into analog signals representing the analog version of the selected waveform;

said processing means being programmed to selectively address one of the waveforms in said processor memory means for supplying a selected block of data words representing the selected waveform for temporary storage in said temporary function memory and for supplying parameter control words to s id function generator respecting the manner in which the selected waveform is to be generated;

said function generator controller including means for receiving and responding to said control words for thereafter and independently of said processing means addressing said temporary function memory to obtain the selected block of data words stored therein and for supplying them to said converter means to generate the analog version of the selected waveform;

said function memory is a read-write random access memory for storing a plurality of waveforms obtained from said procsssor memory means with each said waveform being stored as data words within N sequentially addressable locations therein;

said function generator controller includes means for sequentially addressing each of said N addressable locations of each block of data words stored in said functional memory so as to sequentially obtain therefrom up to N data words representing sequential data points of a selected waveform, means for the controlling the addressing of said function memory so as to commence said addressing at a first of said N sequentially addressable locations and to stop addressing said memory at a second subsequent addressable location, a command word register initially loaded by said data processing means with a mode control word for selecting the mode of operation as being either a continuous generation of said waveform or a triggered mode of operation wherein commencement of the generation of the waveform requires a trigger signal, and for selecting an operation clock for the use by the function generator controller, and trigger and hold logic circuitry responsive to at least a portion of said mode control word for enabling or disabling said master clock in dependence upon the selected mode of operation and upon receipt of a trigger command to enable waveform generation during a trigger mode of operation, and in response to a hold command to stop waveform generation during the trigger mode of operation.

14. A waveform generator system as set forth in claim 13 including master clock select logic responsive to at least a portion of said mode control word for selecting one of a plurality of operating clocks to be used by said function generator controller.

15. A waveform generator system as set forth in claim 14 including a sample-time register initially loaded by said data processing means with a sample time control word defining a scaling factor for dividing down the frequency of a master clock to obtain an addressing clock, and counting means responsive to said sample-time control word for dividing down said master clock to obtain a said addressing clock.

* * * * *